United States Patent [19]

Simpson

[11] 4,147,369
[45] Apr. 3, 1979

[54] MATERIAL HANDLING SYSTEM
[75] Inventor: Paul K. Simpson, Milford, N.H.
[73] Assignee: Sanders Associates, Inc., Nashua, N.H.
[21] Appl. No.: 842,143
[22] Filed: Oct. 14, 1977
[51] Int. Cl.² ............................................. B62B 1/20
[52] U.S. Cl. .................................. 280/30; 190/18 A; 280/47.18; 280/47.31
[58] Field of Search ................. 280/47.31, 47.3, 47.26, 280/47.18, 79.2, 30, 33.99 T, 47.32; 190/18 A; 206/595, 596, 598; 16/43, 29

[56] References Cited
U.S. PATENT DOCUMENTS

| 1,028,178 | 6/1912 | Batchelor | 190/18 A |
| 3,229,991 | 1/1966 | Tessler | 280/47.26 |
| 3,438,544 | 4/1969 | Cloyd | 206/596 |

FOREIGN PATENT DOCUMENTS

| 2255655 | 5/1974 | Fed. Rep. of Germany | 190/18 A |
| 588772 | 6/1947 | United Kingdom | 280/47.3 |

Primary Examiner—John A. Pekar
Attorney, Agent, or Firm—Louis Etlinger; Robert K. Tendler

[57] ABSTRACT

A unitary double-halved shipping container is provided with a wheel well, and detachable arms and wheel assembly to convert the container into a wheelbarrow configuration. This permits ease of handling and maneuvering at low cost in view of the quickly detachable arms and wheel assembly. Integral slots are provided in the container body which accommodate the prongs of a conventional fork lift truck should movement of a number of containers be desired or should the distance of movement be such as to be more conveniently done by fork lift machinery. The halves of the containers are nestable and the slots accommodate securing or shipping straps. The wheel assembly includes a U-shaped spring member, the ends of which are brought together for ease of insertion and release of the wheel. The U-shaped spring member is also provided with a number of outwardly projecting sharp protrusions to secure the wheel assembly to the container when the ends of the U-shaped member are released.

7 Claims, 7 Drawing Figures

U.S. Patent  Apr. 3, 1979  Sheet 1 of 2  4,147,369
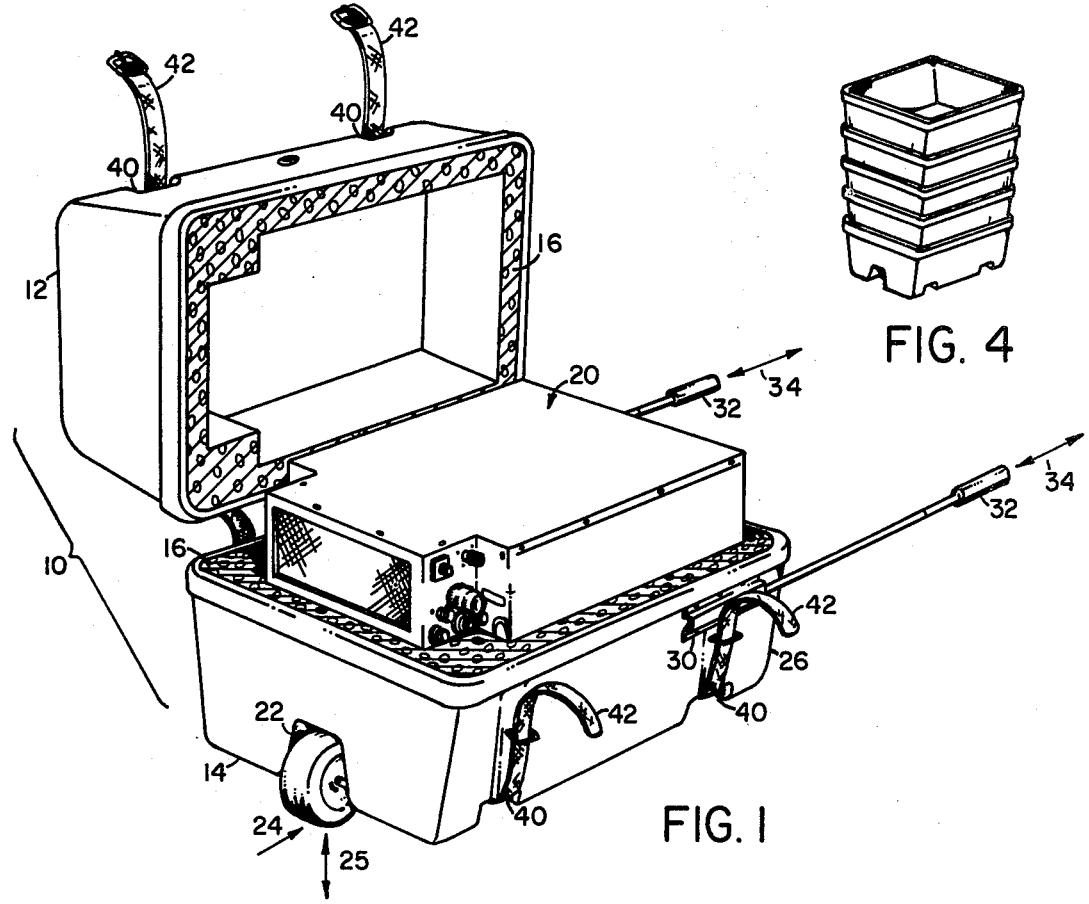
FIG. 4
FIG. 1
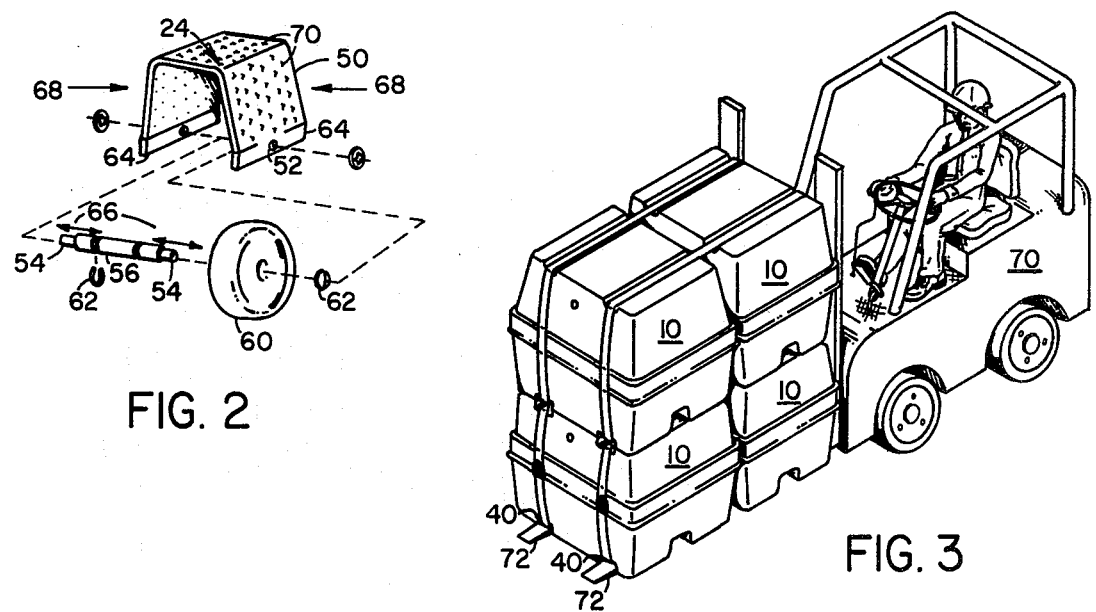
FIG. 2
FIG. 3

MATERIAL HANDLING SYSTEM

FIELD OF INVENTION

This invention relates to shipping containers and more particularly to a shipping container which may be converted into a wheelbarrow configuration by the insertion of the arms and a wheel assembly into appropriate fixtures either integrally formed in the shipping container or carried thereby.

BACKGROUND OF THE INVENTION

In the past, there have been many nestable shipping containers which are unitary in construction and which may be provided with skids and the like to enable the handling of these containers by conventional fork lift equipment. Indeed, in some of the former container systems, a multiplicity of wheels on a dolly-like arrangement have been carried within the top of the container for use upon arrival at the destination of the container. Such a system is shown in U.S. Pat. No. 3,376,046 issued to J. S. Kivett et al. on Apr. 2, 1968. It will be appreciated that in this patent, a dolly-like structure is carried within the container and fits within the grooves on the bottom of the container when it is desired to move the container. The configuration is, however, one in which lateral sway and movement or tipping motion is controlled by a multiplicity of wheels which contact the floor. The same situation applies to U.S. Pat. No. 2,696,990 issued to F. W. Davis, Dec. 14, 1954, which shows spaced-apart wheels utilized with a handle and a strap for moving a suitcase. It will be appreciated that the lateral stability is primarily produced by the spaced-apart wheels and that a single handle is used. Moreover, in the past, pallets have been provided with wheels for easier maneuverability, and one such patent is U.S. Pat. No. 3,211,311 issued to H. Krabbenschmidt on Oct. 12, 1965. In this patent, two wheels are utilized such that when the pallet is tipped upwardly, the wheels contact the ground. It should be noted that these wheels are in spaced-apart relationship and provide a certain amount of lateral stability. It should also be noted that unlike the present invention, which constitutes conversion of a unitary container into a wheelbarrow, this pallet is not unitary in construction and provides no wheelbarrow arms for lateral stability. Moreover, it is not a wheelbarrow configuration in that lateral stability is at least in part provided by the spaced-apart wheels.

As to nestability, it should be noted that a container having nestable sections is illustrated in U.S. Pat. No. 3,113,690 issued to G. F. Swenck, Dec. 10, 1963. However, this container neither has a wheelbarrow configuration nor slots integral to the body in order to permit forklift operation. Moreover, according to U.S. Pat. No. 3,524,415, issued to Albert W. Helman, there have been provided nestable trays with integrally formed feet so as to permit the use of forklift trucks. However, in this patent the tray is not the container, but rather a container sits within the tray and is strapped thereto. Another type tray construction is illustrated in U.S. Pat. No. 3,477,631, issued to C. K. Dunlap, Jr., et al. on Nov. 11, 1969.

The above enumerates just a small number of patents in which various features are illustrated.

However, it will be appreciated that in all of the patents discussed thus far, no wheelbarrow configuration is shown, but rather spaced-apart wheels are utilized. Moreover, while various trays have been provided with slots to accommodate the prongs or tines of a forklift truck, nowhere does it appear that an integral container containing such slots is provided with means for converting it into a wheelbarrow configuration.

It will be appreciated that the ability to quickly convert a shipping container into a wheelbarrow configuration permits ease of handling at the loading or unloading site and provides an inexpensive method of transporting the shipping containers for short distances even if the purpose is to align them for longer distance travel through the utilization of forklift truck apparatus.

It will be appreciated that a wheelbarrow by definition is one that obtains its primary lateral stability by the utilization of two arms and a single wheel or wheels with the arms providing the lateral stability.

In one embodiment of the subject invention, a unitary double-halved shipping container is provided with an integral wheel well and detachable wheelbarrow arms and wheel, thereby to convert the container into a wheelbarrow. This permits ease of handling and maneuvering at low cost due to the quickly detachable arms and wheel. Integral slots are provided in the container to accommodate the prongs of a conventional forklift truck should movement of a number of containers be desired or should the distance be such as to be more conveniently done by forklift machinery. The halves of the container are nestable and the slots accommodate conventional shipping straps. The wheel assembly includes a U-shaped spring member, the ends of which are brought together for ease of insertion of the wheel assembly into the wheel well. Squeezing the ends together also facilitates release of the wheel assembly. The U-shaped spring member is also provided with a number of outwardly projecting protrusions to secure the wheel assembly to the container when the ends of the U-shaped member are released.

As to the wheelbarrow arms, a channelled member is provided on either side of the container at the end opposite that in which the wheel well is formed. These channel members accommodate arms which are inserted into the channel and which may be locked into place or are kept in place via friction. Moreover, a detent of any type may be utilized to secure the wheelbarrow arms within the channels.

When not in use, the wheel assembly and wheelbarrow arms may be shipped with the container itself or may be available either at the loading or unloading site depending on the type of application envisioned. It will be appreciated that the containers when made of polyethylyne are reusable, as are the wheel assemblies and wheelbarrow arms. Thus, only a few pairs of arms and wheel assemblies need be located at any one depot or on/off-loading site.

What has, therefore, been provided is a protective shipping container in which the containers may be grouped for palletized shipment by virtue of their conversion to wheelbarrow type configurations for limited movement at the on/off-loading site. The shipping containers are nestable and reusable and have integral pallet slots which provide feet that are spaced apart far enough to accommodate forklift prongs. Ease of maneuverability at the loading and unloading site is provided by the wheelbarrow configuration which provides a convenient method of manual transport. Not only is a convenient method of manual transport provided by the wheelbarrow configuration, but the utilization of the wheelbarrow configuration reduces mishandling accidents and increases accessibility. The quick connect and disconnect features are also important in that the wheel assembly and arms are quickly attachable and also reusable.

It is, therefore, an object of this invention to provide a material handling method and apparatus which includes the utilization of a container which is easily and quickly converted into a wheelbarrow type configuration.

Another object of this invention is to provide a container with an integral wheel well and releasably mounted wheel assembly therein, as well as a pair of releasably mounted wheelbarrow arms so as to facilitate manual movement of the shipping container.

It is a still further object of this invention to provide a nestable, reusable shipping container and apparatus for converting the container into a wheelbarrow-like configuration for ease of transport of the shipping container.

It is another object of this invention to provide the combination of a shipping container which has both an integral wheel well and integral slots or grooves adapted to receive the prongs of a forklift truck and which is further provided with a wheel assembly and wheelbarrow arms, thereby to provide a shipping container which is easily manually moveable.

These and other objects of the invention will be more apparent when taken in conjunction with the following specification when viewed in connection with the following drawings:

DESCRIPTION OF THE DRAWINGS

FIG. 1 is a diagrammatic illustration of the subject invention showing the adaptation of a shipping container into a wheelbarrow-like configuration;

FIG. 2 is an exploded view of one embodiment of a removeable wheel assembly for the shipping container of FIG. 1;

FIG. 3 is an illustrative diagram of the palletizing of a number of shipping containers such as those illustrated in FIG. 1 and then transport by forklift truck;

FIG. 4 is a diagrammatic view of the nesting of the halves of the container of FIG. 1;

DETAILED DESCRIPTION

Figure 5:
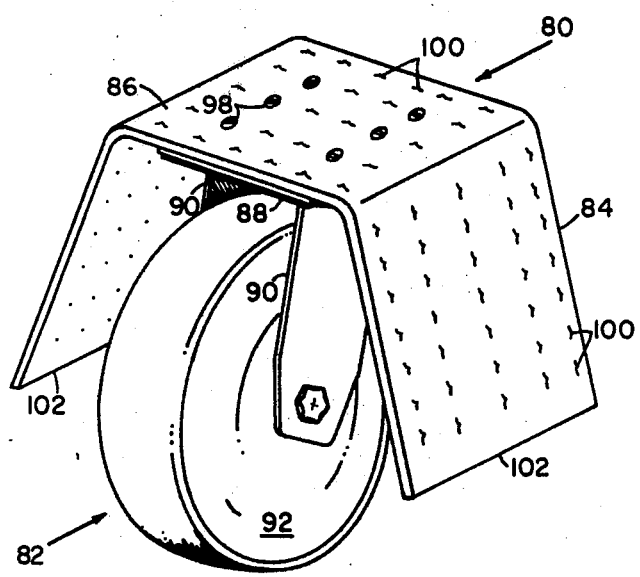
FIG. 5 is a prospective view of a canted wheel assembly for the shipping container of FIG. 1.

Referring now to FIG. 1, a two-halved container generally designated by reference character 10 includes a top half 12 and a bottom half 14. In one embodiment these halves may be made of molded polyethelyne to form reuseable containers. Carried with the halves is foam isolation material 16 formed to accommodate a shipped article 20.

The bottom half 14 is provided in the preferred embodiment with an integral wheel well 22 into which a wheel assembly 24 is releasably mounted as shown by double-ended arrow 25. The well may be omitted or not as desired.

At the end 26 opposite the end having the wheel well a channeled fixture 30 is located for releasably receiving wheelbarrow arms 32 as shown by the double-ended arrows 34. The fixture may either be an external member as shown or integrally molded into the container body. The arms which are shown to be spaced apart and round, in one embodiment are flattened at one end to fit into the channel of fixture 30. These arms may be locked in place by conventional means including detents (not shown), or may be held in place by friction.

Each of the halves is provided with slots 40 spaced to accommodate the prongs of a forklift truck and run transverse to the longitudinal axis of the container in the embodiment illustrated. Conventional tie-down straps 42 are accommodated in these slots to secure the two halves together. Alternatively, any type securing system may be used for the container, and the container need not be of the double half claim shell configuration depicted.

In order to convert the shipping container into a wheelbarrow, as shown in FIG. 2, wheel assembly 24 may include a U-shaped flat spring member 50 having holes or apertures 52 through which the ends 54 of a wheel axle 56 are adapted to pass. Axle 56 accommodates a wheel 60 which is locked in place by C springs 62. The axle ends are then mounted through holes 52 such that ends 64 of the U-shaped member can translate on ends 54 of the axle as shown by double-ended arrows 66.

When it is desired to mount the wheel assembly in the wheel well, ends 54 are squeezed inwardly as shown by arrows 68 so that the assembly may be slipped into the wheel well. Sharp projections or protrusions 70 are provided on the outside of the U-shaped spring member to secure the wheel assembly to the walls of the wheel well. A tap with a hammer assures a snug fit. Removal of the wheel assembly merely requires again squeezing together ends 64.

When used as a wheelbarrow, the container is easily moved about. For longer hauls, the containers may be palletized or stacked as shown in FIG. 3 to be moved about by forklift machinery generally designated by reference character 70, whose prongs 72 project into slots 40.

Nesting of the container halves is shown in FIG. 4. Here the parts may be identical in configuration and may, therefore, be useable interchangeably, and may be reused if desired.

Referring now to FIG. 5, a canted wheel assembly 80 is shown having a wheel unit 82 canted forward at an angle of between 10° and 20° in one embodiment with respect to U-shaped member 84. The U-shaped member does not have aperturned ends as in the first embodiment. Rather, the wheel unit is attached to the U-shaped spring member at its flat top 86.

Figure 6:
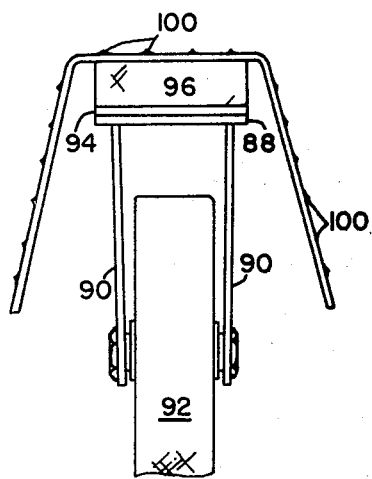
FIG. 6 is a rear view of the wheel assembly of FIG. 5.
Figure 7:
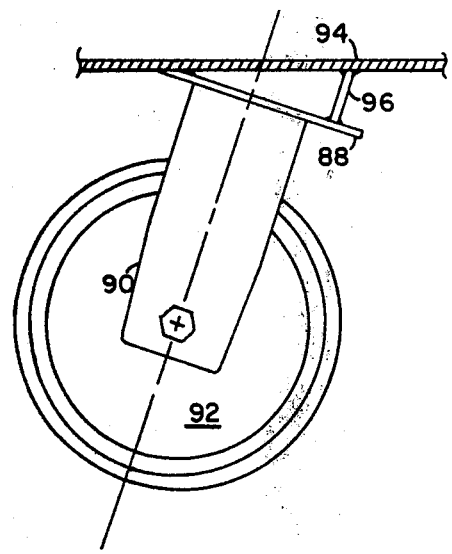
FIG. 7 is a cutaway and plan view of the wheel assembly of FIG. 6 showing the canting of the wheel in a forward direction and the utilization of a welded piece to preserve the canted position.

The wheel unit 82 is made up of a mounting plate 88 to which are mounted a bracket 90, the arms of which are apertured to carry a wheel/axle assembly 92 which may be bolted thereto as shown in FIGS. 6 and 7. Plate 88 in the canted embodiment is welded to a further plate 94 with wedging means 96 between the two plates to maintain the canted position. This may take the form of a welded plate as shown in FIG. 6. Plate 94 is then secured to the top 86 of member 84 by suitable means such as bolts 98 shown in FIG. 5.

As was the case with the FIG. 2 embodiment, sharp projections or other locking means 100 are provided to secure the wheel assembly in the wheel well. In the FIG. 5 embodiment the mounting procedure is the same as the FIG. 2 embodiment with spring ends 102 squeezed together upon insertion into the wheel well. These projections may either be punched-out teeth, heads of bolts, or any locking means which prevents movement of the wheel assembly in the well. Of course, one or more of the spring-loaded wheel assemblies of the type described can be inserted into a corresponding number of wheel wells and provides an excellent detachable unit for any type container or the like.

Alternatively, conventional spring-loaded locking arrangements (not shown) may be used. However, the U-shaped spring embodiment facilitates ease of mounting and removal with a minimum of parts.

It will also be appreciated that any type wheel truck assembly may be secured to the U-shaped member as long as the wheel orientation is fixed with respect to the U-shaped member.

What has, therefore, been provided is a shipping container which may be converted to a wheelbarrow type configuration easily and simply. Moreover, the container in one embodiment has its own fork lift channels so that no pallets are necessary.

Although a preferred embodiment of the invention has been described in considerable detail for illustrative purposes, many modifications will occur to those skilled in the art, which modifications are within the spirit of the invention. It is, therefore, desired that the protection afforded by Letters Patent be limited only by the true scope of the appended claims.

I claim:

1. Apparatus for shipping of goods comprising:
   a shipping container, and
   means for converting said shipping container into a wheelbarrow configuration including a wheel well opened exteriorly on two adjacent sides, said wheel well being integrally formed at one end of said shipping container at an edge thereof, a releasably attachable spring-loaded wheel assembly adapted to be inserted in said wheel well, a pair of arms, and means for releasably attaching said arms at an opposite end of said container.

2. The apparatus of claim 1 wherein said container has a lower front edge and wherein said wheel assembly includes a wheel lying partially within the wheel well and projecting forwardly of said lower front edge.

3. The apparatus of claim 1 wherein said wheel assembly includes a U-shaped spring with outwardly projecting detent means thereon, said U-shaped spring having two ends which are squeezed together to permit insertion of the wheel assembly into said well.

4. The apparatus of claim 1 wherein said wheel assembly includes a wedge assembly fixedly attached to said wheel assembly for canting said wheel in a predetermined direction.

5. The apparatus of claim 1 wherein said container includes in combination therewith integral slots for receiving the prongs of forklift truck.

6. Apparatus of claim 1 wherein said pair of arms are unconnected and wherein said means for releasably attaching said arms includes means for attaching said arms at opposite lateral sides of said opposite end of said container.

7. Apparatus for transporting goods comprising:
   a shipping container having a wheel well integrally formed at one end of the bottom of the shipping container;
   a releasably attachable wheel assembly including a wheel and an inverted U-shaped spring having a flexibility such that its two free ends may be manually squeezed together to permit insertion of the wheel assembly into said well for movement of said container and to permit easy removal of said wheel assembly so that the container may be reused, said wheel being mounted between the sides of said U-shaped spring;
   a pair of arms, and
   means for releasably attaching said arms to said container at an opposite end of said container, whereby said wheel assembly and said arms convert said container into a wheelbarrow configuration.

* * * * *